UNITED STATES PATENT OFFICE.

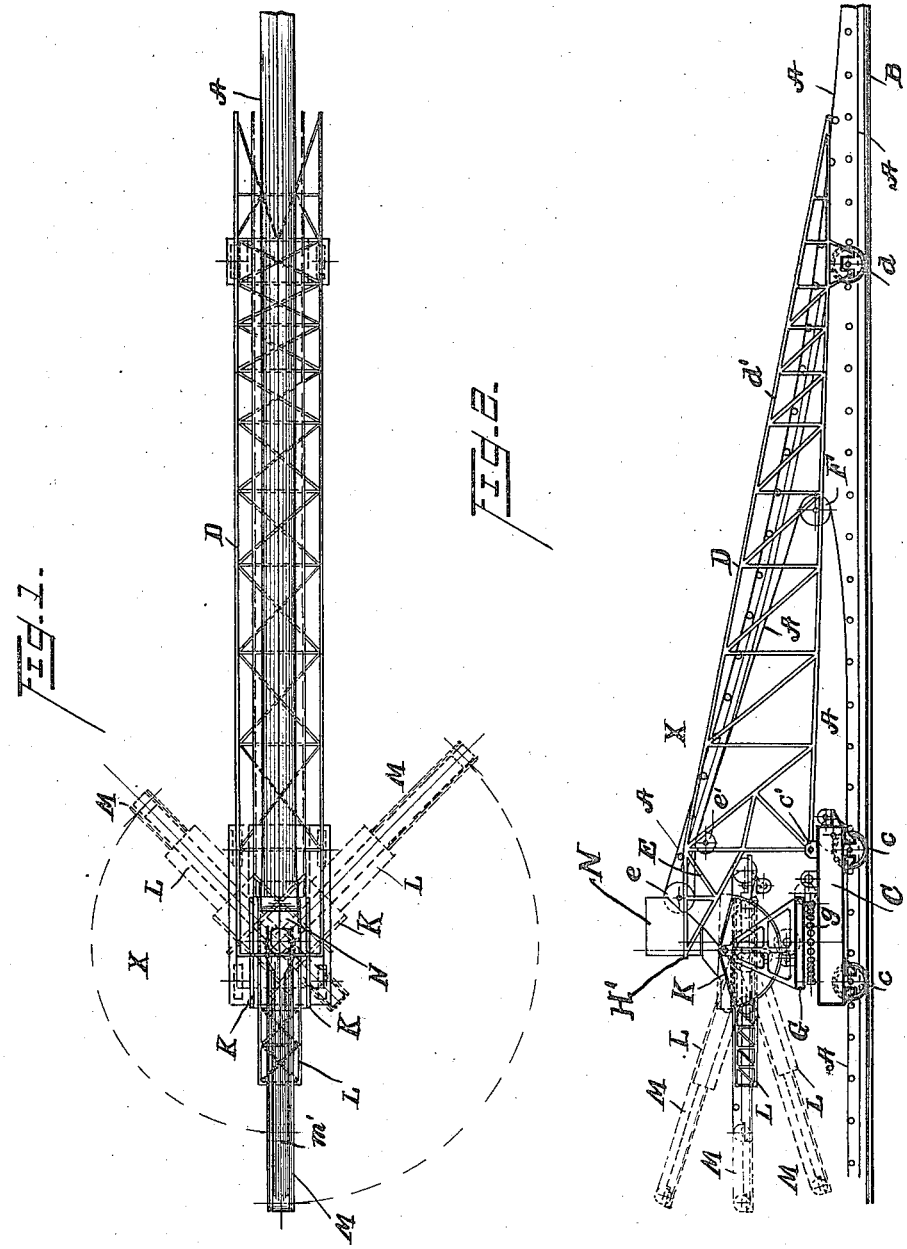

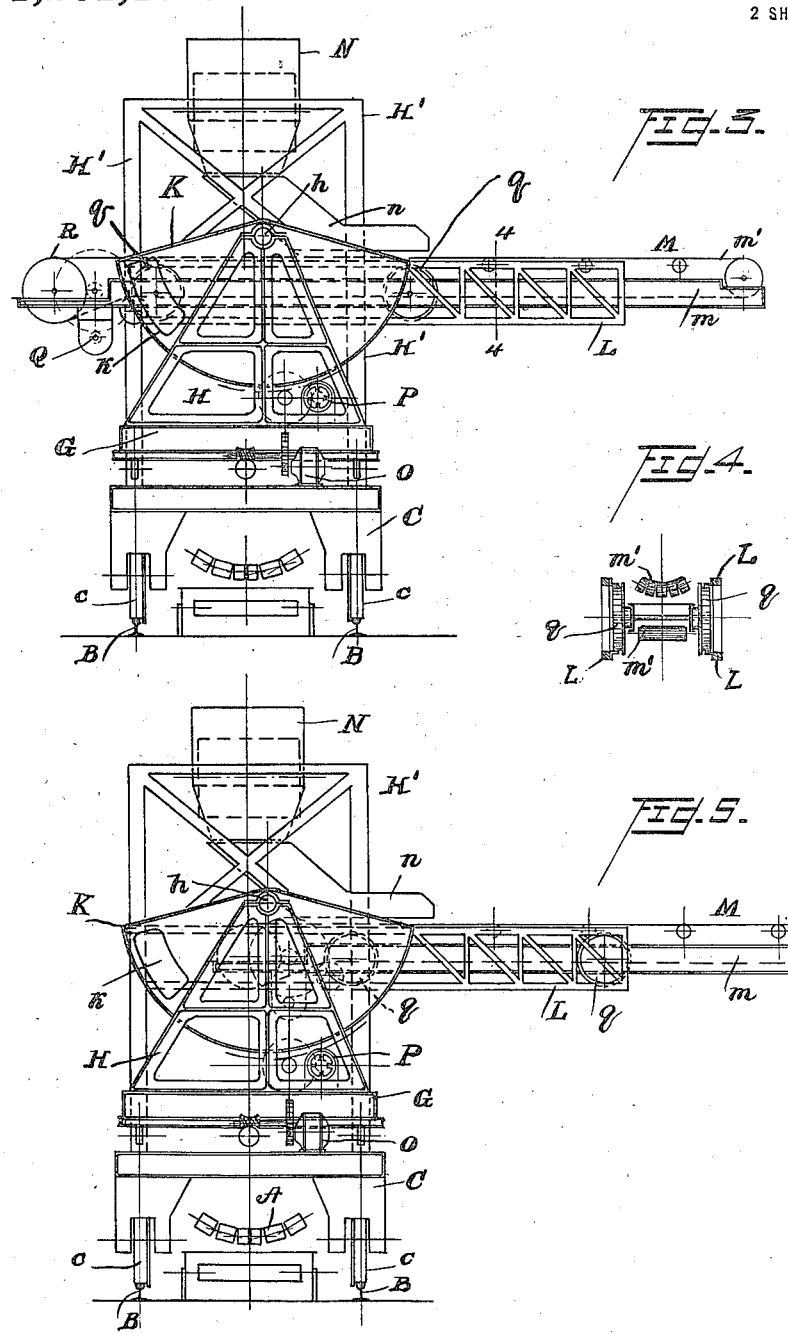

FRANCIS LEE STUART, OF BALTIMORE, MARYLAND.

CONVEYING AND LOADING APPARATUS.

1,261,179.    Specification of Letters Patent.    Patented Apr. 2, 1918.

Application filed April 4, 1916. Serial No. 88,826.

*To all whom it may concern:*

Be it known that I, FRANCIS LEE STUART, a citizen of the United States, residing in Baltimore, Maryland, have invented certain new and useful Improvements in Conveying and Loading Apparatus, of which the following is a specification.

This invention relates to apparatus for conveying coal, ore and other such material by means of conveyer belts to apparatus which receives the material so conveyed and delivers it to storage piles, bins, cars, vessels, or other receivers, and the object of the invention is to provide an apparatus which may be used in connection with an ordinary conveyer belt and which is so constructed that it may receive material from such conveyer and carry and deliver it at any desired elevation or in any desired vertical plane, and which is movable to any required place while still in operative relation with the main conveyer.

In carrying out my invention, I employ a main conveyer belt which may be supported and operated in any usual way, and I connect with this belt an apparatus which is movable on a track to deliver at any required place alongside the track. The belt is formed with a looped portion which is supported on an inclined frame or truss mounted on a truck traversing the track, the belt being reeved in the inclined frame in such manner that the upper end of the looped portion thereof will always deliver at the same elevation whatever be the position of the truck on the track. The truck supports a turn-table on which is erected a frame supporting an oscillating frame to which is secured a cage having guides in which travel the wheels of a delivery conveyer frame which is movable endwise in the cage and which supports an endless conveyer belt that receives material from a hopper into which the main conveyer belt discharges. The arrangement is such that material may be delivered continuously from the main conveyer to the delivery conveyer and the latter may have its outer end raised and lowered to any desired extent or turned and extended to any desired vertical plane without interfering with the delivery of the material from the hopper.

In the accompanying drawings:—

Figure 1 is a plan view of conveying and loading apparatus embodying my invention.

Fig. 2 shows a side elevation thereof.

The remaining figures are on an enlarged scale.

Fig. 3 shows an end elevation of the loading and delivering apparatus.

Fig. 4 is a detail view in transverse section on the line 4—4 of Fig. 3.

Fig. 5 is a view similar to Fig. 3 but showing the delivery conveyer extended.

The main conveyer belt A is mounted and guided in any suitable way between the rails of the track B which may convey material from any distant point and may be driven by any well known mechanism. The apparatus X, to which the main conveyer delivers, comprises a truck C, the wheels $c$ of which traverse the track B, and this truck is connected, as shown at $c'$, with a trussed frame D which at its outer end is supported by wheels $d$ resting on the track. The frame D has an inclined part $d'$ extending from the outer end of the frame to the upper portion E thereof, in which is mounted a pulley $e$ over which the conveyer belt extends and from the under side of which the belt passes to a guide pulley $e'$ and thence to a pulley F over which it passes and then continues in the manner clearly shown in Fig. 2.

The truck C supports a turn-table G resting on anti-friction devices $g$ and on the turn-table is mounted a frame H in which is hung at $h$ an oscillating frame K which supports a horizontally arranged cage L for the delivery conveyer M, which latter comprises a frame $m$ and an endless conveyer belt $m'$.

The main conveyer delivers to a hopper N, mounted on the frame H', and from the hopper the material passes by means of a chute or spout $n$ to the delivery belt $m'$. The chute or spout $n$ as shown is separate from the hopper N and is so constructed that it will always be in proper relation to the belt $m'$ to deliver material to it, irrespective of the position of the belt. The frame H' in which is carried the hopper N is extended from the truss frame D in such a manner that the hopper projects over the chute $n$ and has no vertical supports except at the end of the truss frame D. By this construction the delivery conveyer $m'$ may be swung from one side of the machine to the other, and the rotation thereof will only be limited by the supports of the truss frame D.

The cage L is fixed to the oscillating frame K and projects laterally therefrom and the frame K is weighted at $k$ to counterbalance the cage and the conveyer carried thereby. Any suitable devices may be employed for turning the frame H about its vertical axis. I have indicated at O a motor which may be operatively connected with the turn-table for this purpose. In like manner the oscillating frame K may be swung to any desired extent by motor mechanism P suitably connected therewith.

By the mechanism just described the delivery apparatus may be moved in a horizontal plane to any desired position and its delivery end may be raised or lowered to any desired extent. The delivery conveyer frame $m$ is mounted on wheels $q$ traversing guides in the cage L and said frame $m$ may be moved inward and outward in the cage by suitable motor mechanism Q connected therewith. The delivery conveyer belt $m'$ may be driven by suitable mechanism such as a motor R. The organization as a whole is such that the delivery apparatus may be moved to any desired position on the main track B without disturbing the relation of the receiving hopper with the main conveyer belt and the hopper will always deliver properly to the delivery conveyer, which latter may be extended or lengthened when necessary and its outer end may be raised and lowered to any desired extent and moved to any vertical plane on either side of the track. In this way material may be discharged wherever necessary over piles, in bins, on any part of gondolas or open cars or the delivery may be effected through the open doors of box cars and in various parts of such cars so as to efficiently trim them.

It will be observed that the apparatus is so organized that there is a minimum amount of breakage as the material passes gently from the main conveyer to the delivery conveyer, and the outer end of this delivery conveyer may be placed close to the point of delivery so as to avoid a long fall for the delivered material.

I claim as my invention:

1. The combination with a main conveyer belt, of a delivery apparatus comprising a truck movable to the point of delivery, a turn-table thereon, a frame supported on the turn-table, an oscillating frame pivotally connected at its upper end with the upper end of said first mentioned frame, a horizontally arranged cage rigidly connected with said oscillating frame and projecting from one side thereof, a delivery conveyer comprising an endless conveyer belt entirely supported by a frame adapted to be reciprocated in the cage, and a hopper receiving material from the main conveyer belt and discharging on to the delivery conveyer.

2. The combination with a main conveyer belt, of a delivery apparatus comprising a truck movable to the point of delivery, a turn-table thereon, a frame mounted on said turn-table, an oscillating frame supported on the turn-table, a motor carried by the truck for operating the turn-table, a motor carried by the turn-table for operating the oscillating frame, a horizontally arranged cage rigidly connected with the oscillating frame and projecting from one side thereof, an extensible delivery conveyer carried by a frame reciprocably mounted in the cage, a motor carried by the frame of said conveyer for operating it, a hopper receiving material from the main conveyer belt, and a chute supported below the mouth of said hopper and turning with the turn-table to deliver to the delivery conveyer in its various adjusted positions.

3. The combination with a main conveyer belt, of a delivery apparatus comprising a truck movable to the point of delivery, a turn-table thereon, a vertical frame supported on the turn-table, an oscillating frame pivotally supported in the vertical frame and having its greatest radius less than the height of the vertical frame to permit of its being rocked in the vertical frame, a delivery conveyer projecting from one side of the oscillating frame, and a hopper receiving material from the main conveyer belt and discharging upon said delivery conveyer.

4. The combination with a main conveyer belt, of a delivery apparatus comprising a truck movable to the point of delivery, a turn-table thereon, a vertical frame supported on the turn-table, an oscillating frame pivotally supported in the vertical frame and having its greatest radius less than the height of the vertical frame whereby it may be freely rocked in the vertical frame, an extensible delivery conveyer projecting from one side of the oscillating frame, and a hopper receiving material from the main conveyer belt and discharging upon said extensible delivery conveyer.

5. The combination with a main conveyer belt, of a delivery apparatus comprising a truck movable to the point of delivery, a turn-table thereon, a vertical frame supported on the turn-table, an oscillating frame pivotally supported in the vertical frame and having its greatest radius less than the height of the vertical frame, a cage rigidly connected with the oscillating frame and projecting from but one side thereof, a frame carrying an endless delivery belt reciprocably mounted in said cage, and a hopper for receiving material from the main conveyer belt and discharging onto the delivery conveyer when the latter is in any desired position.

6. The combination with a main conveyer belt, of a delivery apparatus comprising a truck movable to the point of delivery, a turn-table thereon, a vertical frame supported on the turn-table, an oscillating frame pivotally supported in the vertical frame and having its greatest radius less than the height of the vertical frame, a cage rigidly supported in the oscillating frame and projecting from but one side thereof, a frame carrying an endless delivery belt reciprocably mounted in said cage, means on said delivery-belt-carrying frame for driving said belt, and a hopper for receiving material from the main conveyer belt and discharging onto the delivery conveyer when the latter is in any desired position.

7. The combination with a main conveyer belt, of a delivery apparatus comprising a truck movable to the point of delivery, a turn-table on said truck, a vertical frame mounted on said turn-table, a segmental frame suspended in said vertical frame from an axis about which it is adapted to rotate, said segmental frame having its greatest radius less than the height of the vertical frame, an extensible conveyer carried by said frame and projecting from but one side thereof, a counterweight on or near the periphery of the segmental frame to balance the extensible conveyer, and a hopper for receiving material from the main conveyer belt and discharging to the delivery conveyer.

8. The combination with a main conveyer belt, of a delivery apparatus comprising a truck, a turn-table on said truck on which is mounted a delivery conveyer, a hopper for receiving material from the main conveyer belt projecting over and discharging onto said delivery conveyer, and a support for said hopper adapted to permit of said delivery conveyer being turned from one side of the truck to the other.

9. The combination with a main conveyer belt, of a delivery apparatus comprising a truck, a turn-table on said truck, a delivery conveyer mounted on said turn-table, a hopper for receiving material from the main conveyer and discharging onto the delivery conveyer, a frame for supporting said hopper over said delivery conveyer, said frame having vertical supports on but one side.

10. The combination with a main conveyer belt, of a delivery apparatus comprising a truck movable to the point of delivery, a turn-table thereon, an oscillating frame supported on the turn-table, an extensible delivery conveyer carried by the oscillating frame, a hopper receiving material from the main conveyer, a chute beneath said hopper for receiving material therefrom and discharging onto the delivery conveyer, said chute being adapted to move with the said delivery conveyer and deliver thereto when the latter is in any desired position.

In testimony whereof, I have hereunto subscribed my name.

FRANCIS LEE STUART.

Witnesses:
  E. R. SPARKS,
  A. H. SCHAEFFER.